United States Patent [19]

Subbanna et al.

[11] 4,162,295

[45] Jul. 24, 1979

[54] METHOD FOR PRODUCTION OF ALKALI METAL CHROMATES FROM CHROME ORES

[75] Inventors: Somanahalli N. Subbanna, Camillus; Thomas R. Morgan, Solvay; Douglas G. Frick, La Fayette, all of N.Y.

[73] Assignee: Allied Chemical Corporation, Morristown, N.J.

[21] Appl. No.: 851,230

[22] Filed: Nov. 14, 1977

[51] Int. Cl.$^2$ .............................................. C01G 37/14
[52] U.S. Cl. ........................................ 423/61; 423/53; 423/596
[58] Field of Search ............................ 423/53, 61, 596

[56] References Cited

U.S. PATENT DOCUMENTS

| | | | |
|---|---|---|---|
| 797,323 | 8/1905 | Romer | 423/61 |
| 1,631,170 | 6/1927 | Weise | 423/61 |
| 1,752,863 | 4/1930 | Tarr | 423/61 |
| 1,901,939 | 3/1933 | Vetter | 423/61 |
| 1,948,143 | 2/1934 | Tarr | 423/61 |
| 2,199,929 | 5/1940 | Van Wert | 423/61 |
| 2,416,550 | 2/1947 | Udy | 423/61 |
| 3,812,234 | 5/1974 | Schafer et al. | 423/61 |
| 3,819,800 | 6/1974 | Shaffer et al. | 423/61 |
| 4,066,734 | 1/1978 | Bockelmann et al. | 423/61 |

OTHER PUBLICATIONS

Doerner et al., "Bulletin V, Bureau of Mines", Sep. 1939, 28 pages (pp. 8–13 cited).

Primary Examiner—Herbert T. Carter
Attorney, Agent, or Firm—Anthony J. Stewart; Thomas D. Hoffman

[57] ABSTRACT

A method for producing alkali metal chromates by double roasting chrome ores without the use of alkaline earths is disclosed. The pollution and hygiene problems associated with the use of lime are substantially eliminated and only negligible amounts of alumina are found in the product chromate liquors without employing steps previously thought necessary. These advantages are achieved by controlling (1) the Bichromate Equivalent: aluminum oxide ratio in the mix, (2) the amount of alkali metal salts added to the mix, (3) the roasting time, (4) the composition and alkalinity of the liquor used for leaching the roast, and (5) the temperature employed, in both roasts.

14 Claims, No Drawings

METHOD FOR PRODUCTION OF ALKALI METAL CHROMATES FROM CHROME ORES

BACKGROUND OF THE INVENTION

Field of the Invention

This invention relates to a method for the manufacture of alkali metal chromates from chrome ores by a lime-free double roast wherein the extraction of alumina into the leach liquor is essentially eliminated by controlling a number of process variables within certain critical limits.

2. Description of the Prior Art

It is well known that alkali metal chromates may be produced by roasting of chrome ore, soda ash and lime in an oxygen atmosphere. The roasting operation may be carried out either as a single or double roast at temperatures of around 1150° C., either in a rotary kiln or in a rotary hearth furnace. In a single roast operation, the roast leaving the kiln is cooled, leached, and washed to recover the soluble alkali metal chromate product. The residue left after leaching is either discarded or a part is recycled back to the kiln. In the double roast operations, all the residue from the first roast is recycled back to the process. A part of the residue may be recycled to the first roast as a diluent and the remaining part may be subjected to a second roast in the presence of additional soda ash. The roast leaving the second roast operation may then be cooled, leached and washed to recover soluble alkali metal chromate. The residue left behind is either discarded or a part recycled back to the process. Processes of this type are disclosed in prior art publications with many modifications.

In one modification, lime has been added to the mix to insolubilize and fix the alumina present as calcium aluminate compounds. The addition of the lime however, also forms calcium chromate compounds and these compounds are responsible for pollution and hygiene problems associated therewith. The lime is added to the roast mix to prevent extraction of alumina into the leached liquor in order to avoid the necessity of removing the alumina from the product liquor in recovery of the product. Removal of alumina from the product liquor is quite difficult because of the formation of gelatinous precipitates which are difficult to filter.

The prior art discloses processes conducted in the absence of added lime as well as in the presence of added lime. For example, U.S. Pat. No. 797,323, a 1905 patent, discloses a double roast, lime-free process using a relatively high percentage of soda ash but no residue is recycled. The amount of soda ash is controlled to avoid fusion of the mass during roasting but, this system is not applicable to rotary kiln operations. Furthermore, excess alumina is extracted into the product liquors. A similar process is described in British Pat. No. 270,143 wherein a lime-free roast is disclosed in the first step, and wherein the roast mix contains only a mixture of ore and soda ash with the soda ash being maintained in generally high amounts and with lime used in the second step.

A process is disclosed in U.S. Pat. No. 1,948,143 wherein a mixture of lime, soda ash, and leached residue from a preceding first stage roast, are used to roast the chrome ore. U.S. Pat. No. 2,199,929 discloses a continuous countercurrent leaching step in a lime-free double roast but it describes no procedure to prevent extraction of alumina into the leach liquor. Also, U.S. Pat. No. 1,752,863 discloses a method for the roasting of chromium ores in the presence of soda ash and lime with subsequent leaching of the products but wherein a portion of the leaching residue may be used to replace some of the lime in the initial step. A similar process may be found in U.S. Pat. No. 3,812,234 wherein recycle treatment residue is considered to be an equivalent diluent to dolomite, iron ore and the like, in the roasting of chromium ores with soda ash, but in this patent, the chromium-containing material is initially heated under fluidizing conditions with specific preheating and fluidizing procedures required for good recovery of products.

U.S. Pat. No. 3,819,800 discloses a lime-containing roasting process wherein a small amount of lime in the range of 1-3% is maintained in the roast mix and alumina is extracted together with alkali metal chromate in the product liquor with provisions made for removal of the alumina from the product liquor. U.S. Pat. No. 1,631,170 and British Pat. No. 1,057,678 disclose processes wherein lime-free roasting of chromium ores is carried out in the presence of soda ash and wherein leaching of the resulting product is carried out under acidic conditions. Sodium aluminate is produced in both processes and complicated separation steps are required to prevent extraction of alumina into the product chromate solutions.

All of these prior art processes indicate that various techniques have been used so as to conduct the roasting operation under conditions to minimize material costs and still recover good yields of the desired alkali metal chromate. The process of the present invention meets these objectives.

SUMMARY OF THE INVENTION

It is accordingly one object of the present invention to provide a method for the manufacture of alkali metal chromates from chromium ore by a double roasting method wherein certain critical limitations are controlled within desired ranges in order to minimize extraction of alumina into the product chromate solution and also to avoid the addition of calcium oxide to the roasting mix.

It is a further object of the invention to provide a method for roasting chrome ore for recovery of alkali metal chromates which overcomes or otherwise mitigates problems of the prior art.

A still further object of the invention is to provide a method for the manufacture of alkali metal chromates from chrome ore by a double roasting method in the absence of added calcium oxide.

Other objects and advantages of the present invention will become apparent as the description thereof proceeds.

In satisfaction of the foregoing objects and advantages there is provided by this invention a method for the manufacture of alkali metal chormates from chrome ore which comprises a lime-free double roasting step procedure, the initial roast comprising reaction of the chromium ore with an alkali metal salt and recycle residue from a prior roasting step in an oxygen-containing atmosphere at a temperature in the range of 900°–1200° C., with a minimum roasting residence time of at least about 30 minutes, cooling the resulting roast mix and leaching with a liquor having an alkalinity value in the pH range of about 4.5 to 12.0, separating the product liquor containing alkali metal chromate values from a resulting leached residue, recycling a portion of the leached residue to said first roast, and removing the remainder of said residue to a second roast and roasting in the presence of an additional alkali metal salt in an oxygen-containing atmosphere at temperature of 900°-1200° C. for a minimum residence time of at least about 45 minutes, cooling the resulting mix and leaching chromate values therefrom with a leach liquor having a pH of about 4.5 to 12.0. In the first step of the roast, it is important to maintain the Bichromate Equivalent (explained below) to aluminum oxide ratio in the mix in the range of about 3.0:1 to 10:1, and the amount of alkali metal salt in the range of about 35 to 80 percent of the stoichiometric amount required to react with the chrome in the mix. In the second roasting step the Bichromate Equivalent to aluminum oxide ratio in the mix is maintained in the range of about 1.5:1 to 4:1 and the amount of alkali metal salt is maintained in the range of about 30 to 60 percent of the stoichiometric amount required to react with the chrome in the mix.

The Bichromate Equivalent (B.E.) of the total chrome (T) in the mix or solution is employed often in the description of this invention. The Bichromate Equivalent (B.E.) is defined by the following expression:

$$\text{Bichromate Equivalent} = \frac{\text{Mol. Wt. of } X_2Cr_2O_7 \cdot 2H_2O}{y \text{ times} \left\{ \begin{array}{c} \text{Mol. wt. of chrome compound} \\ \text{or} \\ \text{Mol. wt. of alkali metal chrome compound} \end{array} \right\}} (T)$$

where
- $x$ = the alkali metal in alkali metal bichromate,
- $y$ = 1 when chrome compound or alkali metal chrome compound contains two Cr atoms, and
  = 2 when chrome compound or alkali metal chrome compound contains one Cr atom.
- $T$ = the weight in grams, of chrome compound to be expressed as Bichromate Equivalent.

Thus, when sodium chromate is the chrome compound, the B.E. is given by the following expression:

$$B.E. = \frac{298}{2 \times 162} (T) = 0.9198 \cdot (T)$$

in which T is the weight in grams, of the sodium chromate.

DESCRIPTION OF PREFERRED EMBODIMENTS

As pointed out above, it is well known that alkali metal chromate values can be recovered from so-called chrome ores or chromite ores by disintegrating the ores in the presence of an alkali metal salt, usually soda ash ($Na_2CO_3$), and an additional material often called a diluent such as lime, magnesium oxide, recycled residue from a previous roasting step, or the like, at a 900°-in the range of 900°-1200° C. The roasting is normally carried out in rotary kilns or hearth furnaces of various types. The material to be roasted will normally be passed through the furnaces countercurrently to hot oxygen-containing gases and the furnaces are preferably directly heated by the combustion of carbon-containing materials. The alkali metal salt used is normally soda ash and is used either in a stoichiometric quantity, in a deficient amount or in excess over the stoichiometric amount based on the chromite ore to be disintegrated as well as on the process conditions employed. These processes have been carried out by both single and double roast methods utilizing various conditions for their operation.

The present invention provides a novel method by which alkali metal chromates may be produced and recovered from chrome ores using a double roast method which can be carried out in the absence of added alkaline earth materials such as lime or other calcium oxide-containing materials. In the present invention a multistage roasting method for manufacturing chromates is provided wherein negligible amounts of alumina are extracted into the product liquor and the previous requirement of special steps to remove alumina from product liquors is obviated. These advances have been achieved by controlling the Bichromate Equivalent to aluminum oxide ratio in the mix, controlling the weight percent of alkali metal salts such as soda ash ($Na_2CO_3$) added to the mix, controlling the roasting time, and the alkalinity and composition of liquor used for leaching the roast, as well as the temperature of both roasting steps, within certain optimum ranges. It has been found that the lime-free roast of this invention provides advantages in reducing the costs of removing alumina from these product liquors as well as saving costs of adding the lime raw materials. The system also substantially eliminates pollution, hygiene and plant production problems associated with the use of the lime. Further, it increases plant production capacity and decreases energy consumption by operating the first roast at lower temperatures. Further, by the elimination of lime from the roast the amount of residue or refuse discarded is decreased by up to 40% so that the existing disposal sites can be used for longer periods.

In the prior art it was generally believed that if lime was not used in the mix, aluminium hydroxide would be extracted into product liquor and therefore provision had to be made for removal of aluminium hydroxide from the product liquor. However, it has been found according to the present invention that if suitable conditions within certain desired limits are maintained, the formation of alkali metal chromate over the aluminate will predominate, which makes solubilization of the alumina negligible.

In general, the roasting of chromite ore with soda ash in the presence of oxygen to form alkali metal chromates proceeds according to the following equation:

$$Cr_2O_3 + 3/2 O_2 + 2Na_2CO_3 \rightarrow 2Na_2CrO_4 + 2CO_2 \tag{1}$$

The chromite ore however, also contains alumina ($Al_2O_3$) which can react with the soda ash according to the following equation:

$$Al_2O_3 + Na_2CO_3 \rightarrow 2NaAlO_2 + CO_2 \tag{2}$$

The sodium aluminate formed can further react with chromium oxide present to form alkali metal chromate as follows:

$$4NaAlO_2 + Cr_2O_3 + 3/2 O_2 \rightarrow 2Na_2CrO_4 + 2Al_2O_3 \tag{3}$$

The present invention provides conditions which cause reactions (1) and (3) to occur preferentially over the reaction of equation (2) whereby the sodium chromate can be formed with negligible solubilization of alumina in the system. Thus, reactions (1) and (3) occur preferentially over reaction (2), when the $Cr_2O_3$ concentration is increased and the aluminum oxide concentration is decreased in the roasting mix. It has been found that controlling the Bichromate Equivalent/aluminum oxide ratio in the mix, providing longer roasting times, and insufficient alkali in the mix, cause (1) and (3) to predominate in this system.

It has therefore been discovered according to the present invention that the following conditions are necessary to provide a process wherein chromate formation predominates and negligible alumina is extracted into the product liquor. These conditions are achieved by controlling the following variables:

(1) the Bichromate Equivalent/aluminum oxide ratio in the mix;

(2) the amount of alkali added to the mix (percent stoichiometric alkali in mix);

(3) the roasting time in kiln; and (4) the alkalinity and composition of the leach liquor.

Therefore, a double roast method of producing alkali metal chromate has been found which does not require the incorporation of alkaline earth materials such as lime to control the extraction of alumina. Thus, it has been found that by controlling the Bichromate Equivalent/alumina ratio, the amount of alkali, total roasting time of the chrome and the composition and alkalinity of leaching liquor, that the soluble aluminates in the product liquors can be minimized to acceptable levels. In one aspect, the recycled residue has been increased in the initial roasting step in order to replace the lime used in the mix because the recycled residue acts as a diluent in controlling the liquid-solid ratio and fusing of roast in the kiln. In the system a double roast is employed wherein the first roast consists of chrome ore, soda ash and recycle residue. At least a portion of the residue left after leaching may be recycled back to the process to provide the necessary residue. Thus, a part of the residue is used in the first roast as a diluent and the remaining residue may be roasted in the second stage with additional soda ash. The residue left after the second roast may be either discarded or a portion recycled to the first and/or second roasting step of the process.

In the process of the invention, it has been found that for any given Bichromate Equivalent/aluminum oxide ratio in the mix there exists a critical level of soda ash or other alkaline salt below which the extraction of alumina into product liquors is negligible. As the soda ash increases above the critical level the extraction of alumina into the product chromate liquor increases very rapidly.

According to the present invention, it has been found that the Bichromate Equivalent/aluminum oxide ratio should range from 3:1 to 10:1, preferably 4:1 to 5:1 in the first roast and from 1.5:1 to 4:1, preferably 2:1 to 3:1 in the second roast. Further, the amount of alkali metal salts such as soda ash, is maintained in the mix at a critical value below the stoichiometric amount required without liquors producing unacceptable amounts of alumina in the product chromate liquors. This critical value, which depends on the Bichromate Equivalent (B.E.) to alumina ratio in the system must be maintained in a range of about 35 to 80%, preferably about 35 to 55%, and most preferably about 40 to 45% of the stoichiometric amount in the first roast and in a range of about 30 to 60%, preferably about 40 to 60%, and most preferably about 45 to 55% of the stoichiometric amount in the second roast. In general, the lower ratios of B.E./$Al_2O_3$ require lower critical amounts of soda ash. Thus, it may be stated that as the Bichromate Equivalent to alumina ratio decreases in the system the critical level of alkali metal salt, e.g. soda ash, also decreases.

While soda ash ($Na_2CO_3$) is the preferred alkali metal salt to be maintained in the system in the production of sodium chromate or sodium dichromate, it is of course to be understood that other alkali metal salts such as sodium bicarbonate, potash, sodium sulfates, potassium sulfates, potassium carbonate, lithium carbonate and mixtures thereof may also be employed.

It has also been found that the roasting time is critical in maintaining acceptably low levels of alumina in the product chromates. The roasting time in the first step is 30 minutes or higher, preferably 30 to 360 minutes, while in the second step a roasting time of more than about 30 minutes, preferably 45 to 360 minutes, is required to give the best results. In accordance with the present invention, for a given B.E./$Al_2O_3$ ratio and the percent stoichiometric alkali metal salt in the mix, the extraction of alumina into the product liquor decreases as the roasting time increases above about 30 minutes in the first step and 45 minutes in the second step. Depending on the type of roasting equipment used, roasting time may extend as high as 360 minutes in both roasts.

As indicated above, the system is operated wherein in an initial roast step, the chrome ore, the sodium salt and recycle residue are reacted in the presence of an oxygen-containing gas in a kiln, hearth furnace or the like. When either air or pure oxygen is employed as the oxygen-containing atmosphere in both roasts, similar results are obtained. It has been found that the temperature to be maintained in the first roasting step should range from about 900° to 1200° C. and preferably from 900° to 1050° C. This is critical since temperatures above or below these levels effect deleterious results. Therefore, the temperature ranges given represent highly preferred embodiments.

On completion of the initial roasting step, the resulting roast is then cooled to the range of 700°–800° C. and the alkali metal chromate values are leached from the roast to separate these values from a resulting residue. A further feature of the present invention is that the leach liquor should have a pH ranging from about 4.5 to 12, preferably about 5 to 8 as it has been found that the extraction of alumina into the leach liquor decreases as the alkalinity decreases. The leach liquor may comprise water, weak chromate liquors, or mixtures of weak chromates and dichromate liquors, but should be in the pH range of about 4.5 to 12, preferably about 5 to 8 in order to minimize alumina extraction.

After the leaching step is completed the alkali metal chromate values are then recovered from the leach liquor or utilized for the production of other materials as in the production of alkali metal chromate by known methods.

The residue recovered from the first leaching is then preferably divided into two portions with one portion being returned to the first roasting step to provide diluent for the system as described above. The second portion is then further roasted with alkali metal salt, preferably soda ash, in the absence of added lime but under conditions similar to the first roast and in an oxidizing atmosphere and wherein the Bichromate Equivalent to alumina ratio previously described is maintained in the mix. The temperature in the second roast may range from 900°–1200° C., preferably 1100° to 1200° C. The roasting time in the second roast is increased to 45 minutes to minimize the extraction of alumina into the product liquor. On completion of the second stage, the roast is removed and leached as described above to recover additional alkali metal chromate values. The resulting residue may be recovered and discarded or a portion thereof may be recycled to the first and/or second roasting step of the process.

It has been found that the process of the present invention provides advantages over previous practice by the elimination of the handling and processing of lime previously used, improves the leachability of the roast sinter, improves the hygiene of the complete process and causes a reduction in pollution by eliminating the formation of calcium chromate compounds in the discarded residue and results in a substantial reduction in the amount of refuse which must be discarded and also by operating at lower temperatures, lowers fuel costs for the process.

The following Examples are presented to further illustrate the present invention and set forth the best mode presently contemplated for its practice. Unless otherwise indicated parts are by weight.

EXAMPLE 1

This example shows that for a B.E./Al$_2$O$_3$ ratio of 6, the amount of soda ash employed in the mix has a direct bearing on the extraction of alumina into the product liquor.

Montrose ore containing 89.2% chrome as B.E. and 14.87% Al$_2$O$_3$ is roasted with various levels of soda ash in an oxidizing atmosphere. The roasting time is 30 minutes, the roasting temperature is 1177° C. The roast is cooled and leached with water. The alumina extracted into leach liquor is given below.

| B.E./Al$_2$O$_3$ ratio in the mix = 6 | |
|---|---|
| Percent Stoichiometric Soda Ash in Mix | Product Liquors % Al$_2$O$_3$ C.T.B. |
| 30 | 0.24 |
| 50 | 0.24 |
| 70 | 0.32 |
| 100 | 12.32 |

(C.T.B. - Compared to Bichromate, % Al$_2$O$_3$ C.T.B. - Percent alumina extracted per 100 lbs. of Bichromate Equivalent).

As used herein, the term "weight percent C.T.B." is intended to mean the weight percent of a given component of the aqueous solution calculated to bichromate basis, as determined by the following expression:

$$\text{Weight Percent } C.T.B. = \frac{W}{B.E.} \times 100\%$$

wherein W corresponds to the actual weight in grams, of the component (e.g., alumina) in the aqueous alkali metal chromate solution, "B.E." is the "bichromate equivalent" described above.

EXAMPLE 2

In this example, a residue containing 43.2% B.E. and 18.9% Al$_2$O$_3$ is roasted with various amounts of soda ash for 30 minutes at 1177° C. in an oxidizing atmosphere. The roast is leached with water and the alumina extracted into product liquor is given below.

| B.E./Al$_2$O$_3$ ratio in the mix = 2.29 | |
|---|---|
| % Stoichiometric Soda Ash | Product Liquor % Al$_2$O$_3$ C.T.B. |
| 45 | 2.64 |
| 60 | 32.0 |
| 75 | 44.2 |

The results indicate the critical level of soda ash is between 45 and 60% of the stoichiometric amount when the B.E./Al$_2$O$_3$ ratio of 2.29.

From examples 1 and 2 it is evident that the critical level of soda ash depends on the B.E./Al$_2$O$_3$ ratio. As the B.E./Al$_2$O$_3$ ratio decreases, the critical level of soda ash also decreases.

EXAMPLE 3

This example demonstrates that in addition to B.E./Al$_2$O$_3$ ratio of percent soda ash in the mix, that roasting time affects the extraction of alumina. It is found that the extraction of alumina decreases as the roasting time increases.

A residue containing 41.2% B.E. and 16.7% Al$_2$O$_3$ is mixed with soda ash. The mixture contained 62% of the stoichiometric alkali based on chrome content, and is roasted in an oxidizing atmosphere at 1177° C. for different time periods. The roast is cooled before leaching with water. The amount of alumina extracted into the product liquors is minimized when the roasting time is 45 minutes or longer.

| B.E./Al$_2$O$_3$ ratio in the mix = 2.47 | |
|---|---|
| Roasting Time Minutes | Product Liquors % Al$_2$O$_3$ C.T.B. |
| 30 | 6.92 |
| 45 | 1.68 |
| 60 | 1.59 |

EXAMPLE 4

This example illustrates that in addition to B.E./Al$_2$O$_3$ ratio, percent soda ash in the mix, and roasting time, that the alkalinity of leach liquor affects the extraction of alumina. The extraction of alumina decreases as the alkalinity of leach liquors decreases.

A mixture of 31.7 parts ore, 15.5 parts soda ash and 52.8 parts recycled residue is roasted in an oxidizing atmosphere at 1177° C. for 30 minutes. The ore contained 89.4% chrome as B.E., and 13.8% Al$_2$O$_3$. On recycling of residue in the roast mix, the B.E. content of the mix varies from 50.7 to 52.8%, and the Al$_2$O$_3$ from 11.4 to 13.9%. After roasting as described above, the roast is cooled to 700° C. before leaching. Liquors used for leaching are either water, aqueous solutions containing sodium chromate, or a mixture of sodium chromate and dichromate.

B.E./Al$_2$O$_3$ ratio (avg.) = 4.12

| pH of Liquor Used for Leaching Roast | % Al$_2$O$_3$ C.T.B. | Product Liquors % Alkali (As Na$_2$CO$_3$) C.T.B. |
|---|---|---|
| 12 | 2.49 | 4.15 |
| 12 | 1.88 | 3.31 |
| 12 | 0.91 | 1.59 |
| 12.3 | 0.70 | 1.31 |

| pH of Liquor Used for Leaching Roast | % Al$_2$O$_3$ C.T.B. | Product Liquors % Alkali (As Na$_2$CO$_3$) C.T.B. |
|---|---|---|
| 8 | 0.06 | 0.49 |
| 8 | 0.05 | 0.48 |
| 5 | 0.02 | — |

EXAMPLE 5

This example illustrates that the optimum temperature range required for the operation of a lime-free first roast is 900° to 1200° C., instead of 1100° to 1200° C. as previously thought necessary. The economic benefits effected by this lower temperature range are obvious.

A mixture of 31.7 parts (wt.) chrome ore, 15.5 parts (wt.) soda ash, and 52.8 parts (wt.) recycled residue is roasted in a suitable furnace under an oxygen-containing atmosphere at a temperature of 800° C. Three similar experiments are run at temperatures of 900°, 1000° and 1177° C. The B.E./Al$_2$O$_3$ ratio in each mix is maintained at about 4.0. Roast samples are removed at various time intervals up to 60 minutes. The roasts are cooled and leached of chromate values.

Results for samples roasted for 30 minutes are given in the table below. Similar results are obtained at longer time intervals.

| Roasting | | Lbs. B.E. Extracted |
|---|---|---|
| Temperature °C. | Time Minutes | per 100 lbs. Mix |
| 800 | 30 | 5.28 |
| 900 | 30 | 17.84 |
| 1000 | 30 | 21.11 |
| 1177 | 30 | 19.70 |

EXAMPLE 6

This illustrates a preferred embodiment of the double roast system of the present invention utilizing the specific criteria discovered for this process.

A first roast charge is prepared by intimately mixing 31.7 parts (wt.) chrome ore, 15.5 parts (wt.) soda ash and 52.8 parts (wt.) recycled residue from a previous first roast. The B.E./Al$_2$O$_3$ ratio in the mix is maintained at 4.66. The soda ash employed in this first roast is 43.35% of stoichiometric amount required. The chrome is reacted with the soda ash in a kiln under an oxygen-containing atmosphere at the optimum temperature of 1050° C. for an optimum roasting time of 30 minutes. The resulting roast is cooled and leached of chromate values using mixtures of weak chromate and dichromate liquors and water according to the known multistage counter-current process. The pH of the leach liquors is varied between about 6.2 to about 7.0 to minimize alumina extraction.

The results of the counter-current leaching of the first roast are given below.

| Solution | Initial pH of Leach Liquor | Composition of Product Liquor | |
|---|---|---|---|
| | | Grams B.E. per 100g of Liquor | % Al$_2$O$_3$ C.T.B. |
| 1$^a$ | 6.8 | 41.3 | 0.024 |
| 2$^a$ | 6.72 | 24.08 | 0.021 |
| 3$^a$ | 6.92 | 8.55 | 0.016 |
| 4$^b$ | 6.5 | 1.72 | 0.093 |

$^a$mixture of weak chromate and dichromate liquors
$^b$distilled water

The strong chromate liquor obtained on leaching the roast contains 41.3 g. B.E. per 100 g of liquor and negligible amounts (0.024% Al$_2$O$_3$ C.T.B.) of alumina, and so no special step is required to remove this alumina.

Residue obtained on leaching the roast is dried and pulverized, and a portion is recycled back into first roast mix. The remainder is used for a second roast operation.

A second roast charge is prepared by intimately mixing about 86% residue from a previous stage and 14% soda ash. The B.E./Al$_2$O$_3$ ratio in the mix is maintained at 2.9 and the critical level of soda ash below which the extraction of alumina is minimized is 54.4% of the stoichiometric amount required. The trivalent chrome left in the residue reacts with the soda ash in an oxygen-containing atmosphere at the optimum temperature of 1177° C. in a kiln for an optimum roasting time of 45 minutes. The second roast, so produced, is cooled and leached as described above for the first roast.

The results of the counter-current leaching of the second roast are given in the table below.

| Solution | Initial pH of Leach Liquor | Composition of Product Liquor | |
|---|---|---|---|
| | | Grams B.E. per 100g of Liquor | % Al$_2$O$_3$ C.T.B. |
| 1$^a$ | 6.71 | 47.06 | 0.04 |
| 2$^a$ | 6.63 | 32.09 | 0.019 |
| 3$^a$ | 6.97 | 15.67 | 0.017 |
| 4$^b$ | 6.2 | 4.11 | 0.041 |

$^a$mixture of weak chromate and dichromate liquors
$^b$distilled water

The residue or refuse obtained from leaching the second roast is either discarded or a portion is recycled to the process to provide the necessary residue for both the first and second roast.

Since various changes and modifications may be made in the invention without departing from the spirit and essential characteristics thereof, it is intended that all matter contained in the above descriptions shall be interpreted as illustrative only, the invention being limited only by the scope of the appended claims.

We claim:

1. A method for the manufacture of alkali metal chromates having a low alumina content, which comprises the following steps:

(a) reacting in a first roasting step a mixture comprising chrome ore, recycled residue from a prior roasting step and alkali metal salt, the amount of alkali metal salt being in the range of from about 35 to 80 percent of the stoichiometric amount required to react with chrome in said mixture, in an oxygen-containing atmosphere at a temperature of from about 900° to 1200° C. for a time period of at least about 30 minutes while maintaining a Bichromate Equivalent to aluminum oxide ratio in said mixture in the range of from about 3.0:1 to 10:1;

(b) cooling the first roast mixture and leaching said cooled mixture with a leach liquor having a pH between 4.5 and 12.0 to remove the alkali metal chromate values and to form a first roast mix residue;

(c) recycling at least a portion of said residue to step (a);

(d) reacting in a second roasting step the remainder of said residue with an additional amount of alkali metal salt, the amount being about 30 to 60 percent of the stoichiometric amount of alkali metal salt required to react with the chrome in said residue, in an oxygen-containing atmosphere at a temperature of from about 900° to 1200° C. for a time period of at least about 45 minutes while maintaining a Bichromate Equivalent to aluminum oxide ratio in the second reaction mixture in the range of from about 1.5:1 to 4:1;

(e) cooling the resulting second roast mixture and leaching said cooled mixture with a leach liquor having a pH between 4.5 and 12.0 to remove said alkali metal chromate values; and (f) recovering alkali metal chromate values removed in steps (b) and (e).

2. A method as described in claim 1 wherein the alkali metal salt is selected from the group consisting of soda ash, sodium bicarbonate, potash, sodium sulfate, potassium sulfate, potassium carbonate, lithium carbonate and mixtures thereof.

3. A method as described in claim 1 wherein in step (a) the temperature in the first roast is 900° to 1050° C.

4. A method as described in claim 1 wherein in step (d) the temperature in the second roast is 1100° to 1200° C.

5. A method as described in claim 1 wherein in step (a) the time period is from about 30 to 360 minutes.

6. A method as described in claim 1 wherein in step (d) the time period is from about 45 to 360 minutes.

7. A method as described in claim 1 wherein the leach liquor in step (b) and step (e) is water, an aqueous solution of sodium chromate or mixtures of aqueous solutions of sodium chromate and sodium dichromate and has a pH between about 5.0 and 8.0.

8. A method as described in claim 1 wherein in step (a), the amount of alkali metal salt is in the range of from about 35 to 55 percent of the stoichiometric amount required and the Bichromate Equivalent to aluminum oxide ratio in the mix is maintained in the range of 4:1 to 5:1.

9. A method as described in claim 8 wherein in step (a) the amount of alkali metal salt is in the range of from about 40 to 45 percent of the stoichiometric amount required.

10. A method as described in claim 1 wherein in step (d), the amount of alkali metal salt is in the range of from about 40 to 60 percent of the stoichiometric amount required and the Bichromate Equivalent to aluminum oxide ratio is maintained in the range of 2:1 to 3:1.

11. A method as described in claim 10 wherein in step (d), the amount of alkali metal salt is in the range of from about 45 to 55 percent of the stoichiometric amount required.

12. A method as described in claim 1 wherein the alkali metal salt is soda ash.

13. A method for the manufacture of alkali metal chromates having a low alumina content, which comprises the following steps:

(a) reacting in a first roasting step a mixture comprising chrome ore, recycled residue from a prior roasting step and soda ash, the amount of soda ash being in the range of from about 40 to 45 percent of the stoichiometric amount required to react with chrome in said mixture, in an oxygen-containing atmosphere at a temperature of from about 900° to 1050° C. for a time period of from about 30 to 360 minutes while maintaining a Bichromate Equivalent to aluminum oxide ratio in said mixture in the range of from about 4:1 to 5:1;

(b) cooling the resulting first roast mixture and leaching said cooled mixture with a leach liquor having a pH between 4.5 and 12.0 to remove the alkali metal chromate values and to form a first roast mix residue;

(c) recycling at least a portion of said residue to step (a);

(d) reacting in a second roasting step the remainder of said residue with an additional amount of alkali metal salt, the amount being about 45 to 55 percent of the stoichiometric amount of alkali metal salt required to react with the chrome in said residue, in an oxygen-containing atmosphere at a temperature of from about 1100° to 1200° C. for a time period of from about 45 to 360 minutes while maintaining a Bichromate Equivalent to aluminum oxide ratio in the second reaction mixture in the range of from about 2:1 to 3:1;

(e) cooling the resulting second roast mixture and leaching said cooled mixture with a leach liquor having a pH between 4.5 and 12.0 to remove said alkali metal chromate values; and (f) recovering alkali metal chromate values recovered in steps (b) and (e).

14. A method as described in claim 13 wherein the leach liquor in steps (b) and (e) is water, an aqueous solution of sodium chromate or mixtures of aqueous solutions of sodium chromate and sodium dichromate and has a pH between about 5.0 and 8.0.

* * * * *